Nov. 20, 1951     E. A. BULLOCK ET AL     2,575,579
MOVING-PICTURE SOUND PROJECTOR
Filed Sept. 15, 1948     2 SHEETS—SHEET 2
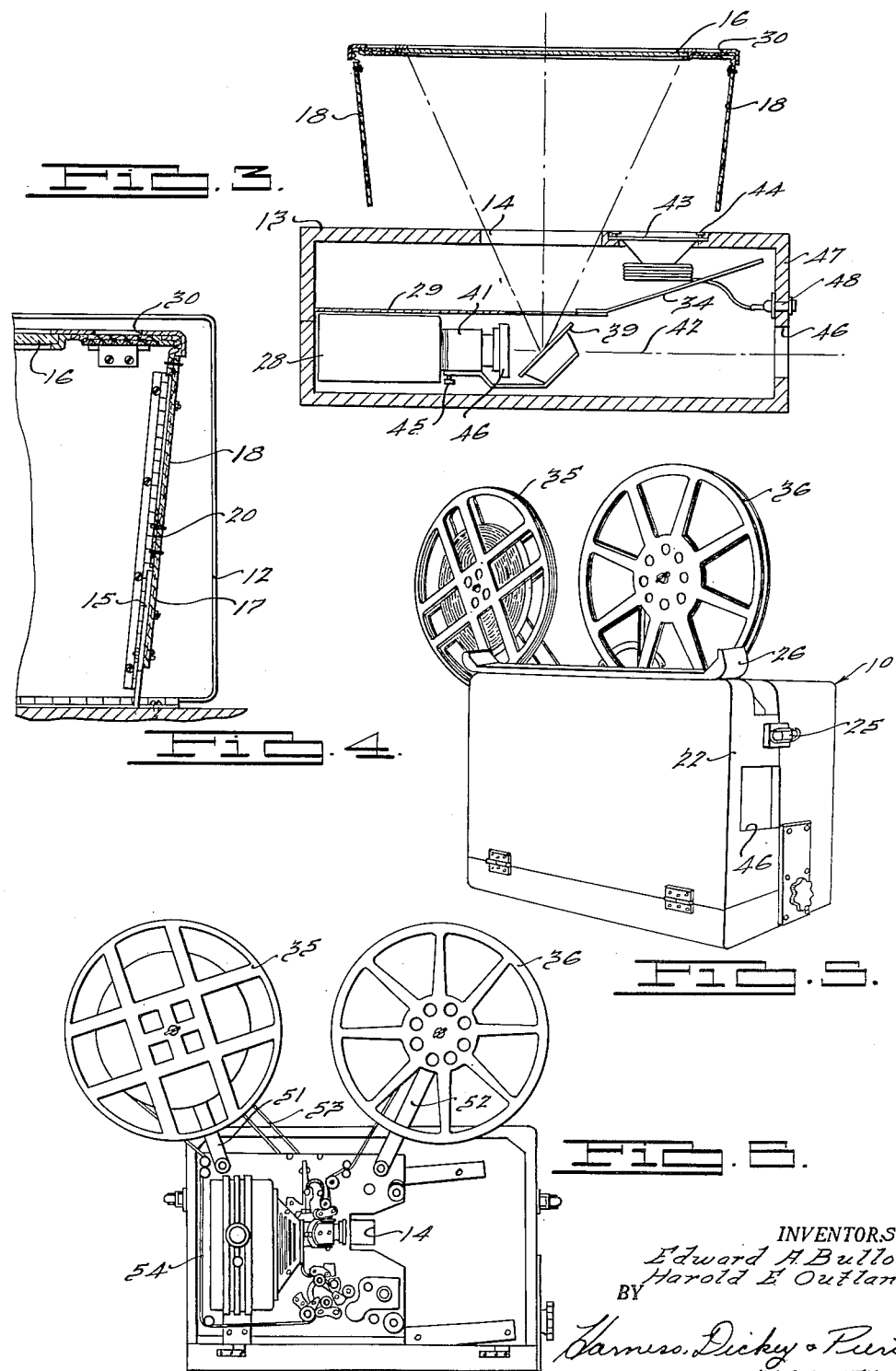
INVENTORS.
Edward A Bullock
Harold E Outland
BY
Harness, Dickey & Pierce
ATTORNEYS Patented Nov. 20, 1951

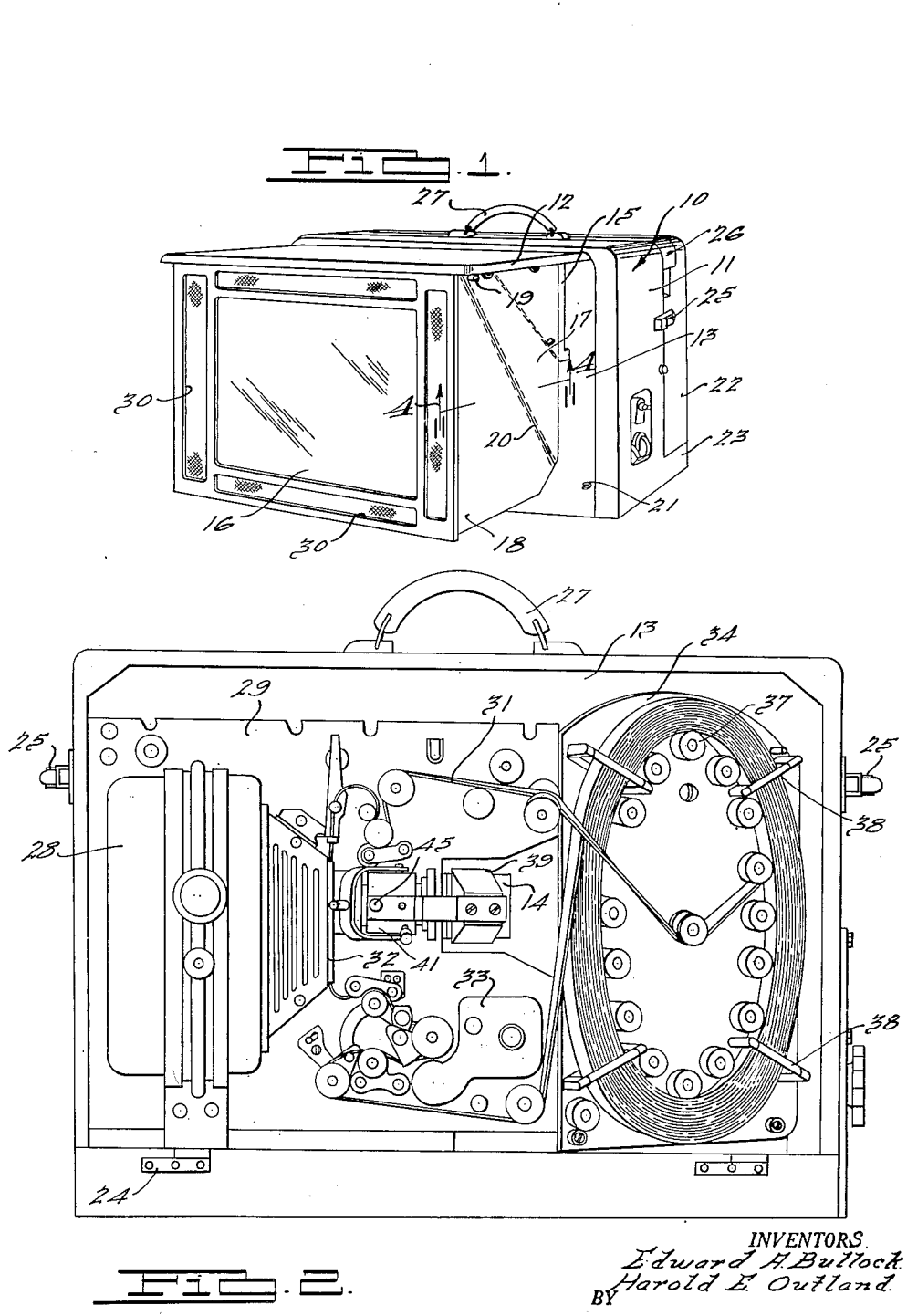

2,575,579

UNITED STATES PATENT OFFICE 2,575,579

MOVING-PICTURE SOUND PROJECTOR

Edward A. Bullock, Detroit, and Harold E. Outland, St. Clair Shores, Mich., assignors to Technical Service Incorporated, Detroit, Mich., a corporation of Michigan Application September 15, 1948, Serial No. 49,348

7 Claims. (Cl. 88—16.2)

1

This invention relates to moving picture projectors, and particularly to a sound picture projecting device contained in a case which is capable of projecting a picture upon a self-contained screen or upon a separate screen spaced from the case.

It has been the practice in the art to provide a case containing a projector having a self-contained screen and a speaking unit for projecting a picture from the projector at an angle onto a screen carried by the case.

The present invention comprises such a sound projector, in a case containing a screen and speaker, and in addition embodies structure whereby the projection may also be made on a separate screen and from a speaker spaced a substantial distance from the case.

The unit is constructed to employ a magazine for continuously projecting a film for any desired length of time, or reels may be provided attachable to the projector for running a film through the projector from one reel to the other in the conventional manner.

Accordingly, the main objects of the invention are: to provide a case containing sound projecting equipment capable of projecting the picture onto an attached screen or onto a separate screen remote from the case; to provide a case containing a sound projecting equipment having openings in adjacent walls so that projection of the picture may be made through the opening in one wall or through an opening in an adjacent wall disposed at right angles thereto; to provide a sound projector for moving pictures with a mirror which is capable of directing light at right angles from the path of light from the projector or, by moving the mirror out of the path of light and changing the lens, to project the picture through a second opening in the case onto a separate screen spaced therefrom; to provide a case with openings in adjacent walls through either of which light rays may be projected having a hinged cover provided with a hinged wall through which the film and reels project during the time the picture is projected; to provide a sound projecting equipment within a case having a speaker which is removable therefrom so that it may be placed a distance from the case and provided with a plug and socket to the latter of which a large speaker or a complete enunciating system may be connected; and, in general, to provide a sound projecting system within a case which is compact in form and which is versatile in use.

Other objects and features of novelty of the invention will be specifically pointed out or will become apparent when referring to a better understanding of the invention, to the following description taken in conjunction with the accompanying drawings, wherein:

Figure 1 is a perspective view of a case having a cover thereon in open position from which a screen is supported upon which the picture may be projected;

Fig. 2 is a view of the case shown from the opposite side from that of Fig. 1, with the hinged cover in open position;

Fig. 3 is a sectional view of the case illustrated in Fig. 1;

Fig. 4 is a broken sectional view of the structure illustrated in Fig. 1, taken on the line 4—4 thereof;

Fig. 5 is a perspective view of the case as illustrated in Fig. 1, shown from the opposite side thereof, with standard reels attached thereto; and Fig. 6 is a view of the structure illustrated in Fig. 5, with the hinged cover in open position.

The carrying case 10 for the sound projecting equipment embodies a main case portion 11 having on one side a hinged cover 12 which extends over a side wall 13 containing an aperture 14. The cover has flanged edges to provide sufficient depth to enclose a screen 16 and foldable side shield portions 17 and 18. The top edge of the screen 16 is hinged to the inside bottom edge of the cover. The top edges of the shield portions 17 are hinged to the cover adjacent to the side edges, while the forward edges of the shield portions 18 are hinged to the side edges of the screen 16. The shield portions 17 and 18 are secured together and fold along the line 20 to shield the screen at the sides when the cover is raised. By pushing the shield portions inwardly along the line 20, the screen and shield portions fold by the weight of the cover as it drops down thereover to closed position. Triangular plates 15 are secured to the hinges of the shield portions 17 and to the shield portions and project to engage the side 13 of the case when the cover is raised. The triangular plates extend between the side edges of the cover 16 and the side 13 of the case when the cover is raised to maintain the cover in raised position. Openings 30 are provided about the screen and are spanned by open-mesh material through which sound from the speaker may pass. Projecting pins 19 engage clips 21 for securing the cover 12 to the side 13 when the screen 16 is not in use.

The opposite side of the case has a cover 22 which is supported upon a ledge 23 by hinges 24. Suitable catches 25 are employed to secure the cover in closed position. The top of the cover contains a slot in which a closure strip 26 is secured by suitable hinges, not herein illustrated. The strip 26, when open, provides a slot through which the reels, hereinafter referred to, extend when they are employed with the projector. A carrying handle 27 is secured to the main body portion 11 of the case.

A sound projector 28 of conventional form is mounted on a wall 29 within the case. The film 31 is fed in the conventional manner, first through a projector 32 and through the sound track equipment 33 either from the continuous film supporting magazine 34 or through the conventional reels 35 and 36. The film magazine herein illustrated is of conventional form, having a plurality of rollers 37 and 38 which support the film in a manner to have it feed onto the outside of the roll and be directed through the machine from the inside thereof. A reflecting mirror 39 is pivoted on the lens supporting sleeve 41 capable of being disposed across the path of light 42 from the projector so as to reflect light at right angles thereto through the opening 14 in the side 13 of the case. This arrangement is employed when the picture is to be projected upon the screen 16, with the loud speaker 43 disposed adjacent thereto on the wall 13.

The speaker is supported by thumb screws 44 which are removable so that the speaker may be moved to a distance from the case. This is desirable when the picture is to be projected along the light path 42 projected from the case onto a screen spaced therefrom. The mirror 39 is removed or hinged upwardly out of the light path 42 on the supporting screw 45 and the lens 46 is changed for one having a greater focal length. In this arrangement, the light from the projector passes directly through an opening 46 in the end wall 47 of the case.

A socket 48 is provided in the wall 47 of the case whereby the speaker 43 may be disconnected and a larger speaker or an entire enunciating system may be plugged thereinto to be actuated by the sound equipment of the case. When the magazine 34 is not employed with the equipment, a pair of reels 35 and 36 is supported upon the projecting device by a pair of arms 51 and 52 driven in the conventional manner by belt 53. The film 54 passes from the reel 36 to the reel 35 in the same manner as the film was fed from the magazine 34 through the device. When the reels 35 and 36 are employed, the closure strip 26 hinged to the case cover 22 is in open position, permitting the cover to be closed during the time the picture and sound are projected. After the film is run from the reel 36 to the reel 35 through the projecting device, the belt 53 may then be changed to rewind the film directly from the reel 35 to the reel 36.

Accordingly, the film may be projected from standard reels through a single cycle or run continuously through any number of cycles when the film is disposed upon a magazine. In either instance, the picture may be projected through the side of the case onto the self-contained screen under which the speaker is mounted, or may be projected through the end opening in the case onto a remote screen adjacent to which the speaker may be placed. In a large auditorium the enunciating system thereof may be plugged into the sound system within the case or a separate loud speaker may be substituted for the smaller speaker provided with the case.

What is claimed is:

1. In a sound projecting device, a carrying case having a hinged door on one side provided with top and side walls cooperating with the main portion of the case, said top wall being of less width to form a slot, a hinged cover on said door for covering said slot, a projecting device within the main portion of the casing, and a pair of reels extending through said slot when said hinged cover is in open position and the door closed, one end of said hinged door wall having an aperture through which direct rays from the projecting portion of the device may pass.

2. In a sound projecting device, a carrying case having a hinged door on one side provided with top and side walls cooperating with the main portion of the case, said top wall being of less width to form a slot, a hinged cover on said door for covering said slot, a projecting device within the main portion of the casing, a pair of reels extending through said slot when said hinged cover is in open position and the door closed, one end of said hinged door wall having an aperture through which direct rays from the projecting portion of the device may pass, the opposite side of the main portion of the case from that having the hinged door containing an aperture, and reflecting means on the projector movable into the path of light therefrom for directing the light at an angle through the opening in said side of the case.

3. In a sound projecting device, a carrying case having a hinged door on one side provided with top and side walls cooperating with the main portion of the case, said top wall being of less width to form a slot, a hinged cover on said door for covering said slot, a projecting device within the main portion of the casing, a pair of reels extending through said slot when said hinged cover is in open position and the door closed, one end of said hinged door wall having an aperture through which direct rays from the projecting portion of the device may pass, the opposite side of the main portion of the case from that having the hinged door containing an aperture, reflecting means on the projector movable into the path of light therefrom for directing the light at an angle through the opening in said side of the case, a cover hinged to the last said side of the case, and a screen hinged to said last cover and movable to a position parallel with said side onto which the reflected light may impinge.

4. In a sound projecting device, a carrying case having a hinged door on one side provided with top and side walls cooperating with the main portion of the case, said top wall being of less width to form a slot, a hinged cover on said door for covering said slot, a projecting device within the main portion of the casing, a pair of reels extending through said slot when said hinged cover is in open position and the door closed, one end of said hinged door wall having an aperture through which direct rays from the projecting portion of the device may pass, the opposite side of the main portion of the case from that having the hinged door containing an aperture, reflecting means on the projector movable into the path of light therefrom for directing the light at an angle through the opening in said side of the case, a cover hinged to the last said side of the case, a screen hinged to said last cover and movable to a position parallel with said side onto which the reflected light may impinge, and closure elements carried at the side edges of the screen and the under side of said last cover for closing the area between the screen side edges and the adjacent side of the case.

5. In a carrying case, a sound projector mechanism having a lens holder and a lens mounted therein with the axis of the lens directed toward one wall having an aperture through which said axis extends and through which light from said projector lens may pass, an adjacent wall of the case having an aperture therethrough through which said light may be reflected in a direction normal to the axis of the lens, a light-reflecting element, and pivot means on said lens holder for supporting said light-reflecting element in a position extending obliquely across said axis between said lens and said one wall and in the path of light from the projector lens for reflecting said light at right angles to said axis and through the aperture in said adjacent wall, said reflecting element being swingable to a position out of said path of light to permit light from said projector to pass through said first-named aperture.

6. In a carrying case, a sound projector mechanism having a lens mounted therein with the axis of the lens directed toward one wall having an aperture through which said axis extends and through which light from said projector lens may pass, an adjacent wall of the case having an aperture therethrough through which said light may be reflected in a direction normal to the axis of the lens, a light-reflecting element, mounting means within said case for supporting said light-reflecting element in a position extending obliquely across said axis between said lens and said one wall and in the path of light from the projector lens for reflecting said light at right angles to said axis and through the aperture in said adjacent wall, said light passing directly through the aperture in said one wall when said light reflecting element is removed from said path of light, and a cover hinged to said adjacent wall and having a screen hinged thereto to be disposed parallel to and spaced outwardly from said adjacent wall and across the path of reflected light.

7. In a carrying case, a sound projector mechanism having a lens mounted therein with the axis of the lens directed toward one wall having an aperture through which said axis extends and through which light from said projector lens may pass, an adjacent wall of the case having an aperture therethrough through which said light may be reflected in a direction normal to the axis of the lens, a light-reflecting element, mounting means within said case for supporting said light-reflecting element in a position extending obliquely across said axis between said lens and said one wall and in the path of light from the projector lens for reflecting said light at right angles to said axis and through the aperture in said adjacent wall, said light passing directly through the aperture in said one wall when said light-reflecting element is removed from said path of light, a cover hinged to said adjacent wall and having a screen hinged thereto to be disposed parallel to and spaced outwardly from said adjacent wall and across the path of reflected light, and foldable elements attached to the sides of the cover and screen and closing the space between the edges of the screen, cover and wall when said screen is disposed as described.

EDWARD A. BULLOCK.
HAROLD E. OUTLAND.

REFERENCES CITED

The following references are of record in the file of this patent:

UNITED STATES PATENTS

| Number | Name | Date |
| --- | --- | --- |
| 1,671,449 | Readeker | May 29, 1928 |
| 1,738,942 | Brenkert et al. | Dec. 10, 1929 |
| 1,746,607 | Readeker | Feb. 11, 1930 |
| 1,954,786 | Bright et al. | Apr. 17, 1934 |
| 2,003,381 | May | June 4, 1935 |
| 2,022,903 | Thomas | Dec. 3, 1935 |
| 2,051,661 | Weber | Aug. 18, 1936 |
| 2,098,988 | Wolfe | Nov. 16, 1937 |
| 2,150,992 | Scott | Mar. 21, 1939 |
| 2,168,761 | Caldwell | Aug. 8, 1939 |
| 2,256,337 | Boor et al. | Sept. 16, 1941 |
| 2,299,657 | Rystedt | Oct. 20, 1942 |
| 2,319,111 | Calvin et al. | May 11, 1943 |
| 2,358,692 | De Vry | Sept. 19, 1944 |
| 2,424,339 | Stechbart et al. | July 22, 1947 |